US008555111B2

(12) United States Patent  
Shimada et al.

(10) Patent No.: US 8,555,111 B2  
(45) Date of Patent: Oct. 8, 2013

(54) METHOD AND APPARATUS FOR OFFLINE DIAGNOSIS BASED ON PRIORIYU LEVEL SETTING

(75) Inventors: Ikuo Shimada, Kawasaki (JP); Mamoru Arisumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 12/913,339

(22) Filed: Oct. 27, 2010

(65) Prior Publication Data

US 2011/0126055 A1    May 26, 2011

(30) Foreign Application Priority Data

Nov. 20, 2009    (JP) ................................. 2009-265597

(51) Int. Cl.  
*G06F 11/00*      (2006.01)

(52) U.S. Cl.  
USPC .............................................. 714/25; 714/37

(58) Field of Classification Search  
USPC ............................................... 714/25, 27, 37  
See application file for complete search history.

(56) References Cited

U.S. PATENT DOCUMENTS

| | | | |
|---|---|---|---|
| 7,962,472 B2* | 6/2011 | Erickson et al. | 707/713 |
| 2003/0074603 A1* | 4/2003 | Bungert et al. | 714/37 |
| 2005/0190699 A1* | 9/2005 | Smith et al. | 370/241 |
| 2008/0005617 A1* | 1/2008 | Maggiore et al. | 714/30 |
| 2008/0039957 A1* | 2/2008 | Hoseinnezhad | 700/44 |
| 2011/0150507 A1* | 6/2011 | Kim | 399/31 |

FOREIGN PATENT DOCUMENTS

| | | |
|---|---|---|
| JP | 7-271432 A | 10/1995 |
| JP | 2000-99484 A | 4/2000 |

* cited by examiner

*Primary Examiner* — Scott Baderman  
*Assistant Examiner* — Joseph Kudirka  
(74) *Attorney, Agent, or Firm* — Fujitsu Patent Center

(57) ABSTRACT

An information processing apparatus includes a memory, and a processor coupled to the memory. The processor is configured to collect information including a diagnosis history regarding a plurality of components of the information processing apparatus in application processing by the information processing apparatus, determine priority level settings from among a plurality of offline diagnoses with regard to each of the components, prioritize offline diagnosis of the information processing apparatus based on the information and the priority level settings, and perform the plurality of offline diagnoses with regard to the components at a time of the offline diagnosis of the information processing apparatus based on the priority level settings.

15 Claims, 18 Drawing Sheets

FIG. 7

```
CPU    : 2008/07/01 12:00 COMPLETE  [100%]
MEMORY : 2008/08/01 12:00 EXECUTING [50%]
HDD    : 2008/09/01 12:00 FAILED    [30%]
I/O    : 2008/10/01 12:00 EXECUTING [70%]
```
39

FIG. 8

```
-NO.1--------------------------------------------------------------
DATE/TIME  : 2008/08/30 HH:MM:SS
TEST       : I/O
PRODUCT    : PRODUCED BY COMPANY XX
MODEL      : XXXX
ERROR LBA  : XXXX
ERROR TYPE : WRITE ERROR
-NO.2--------------------------------------------------------------
DATE/TIME  : 2008/09/01 HH:MM:SS
TEST       : HARD DISK (HDD)
PRODUCT    : PRODUCED BY COMPANY XX
MODEL      : XXXX
ERROR LBA  : XXXX
ERROR TYPE : UNCORRECTABLE ERROR
             (RECOVERY COMPLETED BY AUTOMATIC REPLACEMENT)
------------------------------------------------------------------
```

FIG. 9

```
                                                    ┌36
┌─────────────────────────────────────────────────────┐
│  :                                                  │
│  SERVER MODEL A: INCREASING CPU FAILURES            │
│  SERVER MODEL A: FREQUENT HDD FAILURES              │
│  SERVER MODEL B: FREQUENT CPU FAILURES              │
│  SERVER MODEL C: NO ERROR INFORMATION               │
│  :                                                  │
└─────────────────────────────────────────────────────┘
```

-NO. XXXXXXX-1----------
DATE/TIME: 2008/07/01 HH:MM:SS
SERVER: SERVER Z
SERVER MODEL: MODEL B
REPLACED COMPONENT: HDD
PRODUCT: PRODUCED BY COMPANY XX
MODEL: XXXX
MOUNTING LOCATION: 3.5-INCH BAY #1
REASON FOR REPLACEMENT: FREQUENT CORRECTABLE ERRORS

-NO. XXXXXXX-2----------
DATE/TIME: 2008/09/01 HH:MM:SS
SERVER: SERVER X
SERVER MODEL: MODEL A
REPLACED COMPONENT: I/O(FLOPPY DRIVE)
PRODUCT: PRODUCED BY COMPANY XX
MODEL: XXXX
MOUNTING LOCATION: 5-INCH BAY #2
REASON FOR REPLACEMENT: FLOPPY IS INACCESSIBLE

-NO. XXXXXXX-3----------
:
:

FIG. 11

| | DIAGNOSIS ERROR INFORMATION | DIAGNOSIS HISTORY | COMPONENT REPLACEMENT INFORMATION | COMPONENT QUALITY INFORMATION |
|---|---|---|---|---|
| CPU | NO ERRORS | 2008/07/01 12:00:00 100% FINISHED | NO REPLACEMENT INFORMATION | NORMAL QUALITY |
| MEMORY | NO ERRORS | 2008/08/01 12:00:00 50% FINISHED | NO REPLACEMENT INFORMATION | GOOD QUALITY |
| HDD | ERROR DETECTED (ERROR LOCATION INFORMATION) | 2008/09/01 12:00:00 30% FINISHED | NO REPLACEMENT INFORMATION | WARNING-LEVEL QUALITY |
| I/O | ERROR DETECTED (RECOVERY FINISHED) | 2008/10/01 12:00:00 70% FINISHED | 2008/09/01 REPLACED | GOOD QUALITY |

[DIAGNOSIS ERROR]
ERROR DETECTED=20
NO ERROR=5

[DIAGNOSIS HISTORY]
0-30%=20
31-60%=15
61-90%=10
91-100%=5

[REPLACEMENT INFORMATION]
REPLACED=5
NO REPLACEMENT=20

[QUALITY INFORMATION]
GOOD QUALITY=5
NORMAL QUALITY=10
WARNING-LEVEL QUALITY=15
ALARM-LEVEL QUALITY=20

FIG. 13

| | ALLOCATION OF RESOURCES USABLE FOR DIAGNOSIS | LOCATION OF STARTING DIAGNOSIS |
|---|---|---|
| CPU | 5+5+20+10=40 [20%] | START FROM 0% |
| MEMORY | 5+15+20+5=45 [22.5%] | START FROM 50% |
| HDD | 20+20+20+15=75 [37.5%] | START FROM 30% WITH FOCUS ON VICINITY OF ERROR LOCATION |
| I/O | 20+10+5+5=40 [20%] | START FROM 70% |

METHOD AND APPARATUS FOR OFFLINE DIAGNOSIS BASED ON PRIORIYU LEVEL SETTING

CROSS-REFERENCE TO RELATED APPLICATION

This application is based upon and claims the benefit of priority of the prior Japanese Patent Application No. 2009-265597, filed on Nov. 20, 2009, the entire contents of which are incorporated herein by reference.

FIELD

The embodiments discussed herein relate to an information processing apparatus that performs self-diagnosis of components thereof, a method of diagnosis, and a computer-readable recording medium configured to store a diagnostic program.

BACKGROUND

The diagnosis of failure states or operational states of components making up an information processing apparatus has been performed as part of the maintenance of the information processing apparatus. There are two cases of such diagnosis: one is diagnosis externally performed on the information processing apparatus, and the other is diagnosis performed by the information processing apparatus itself. The self-diagnosis performed by the information processing apparatus itself can be performed, for example, by the information processing apparatus running a diagnostic program.

There are two cases of self-diagnosis: one is the case in which diagnosis is performed while the information processing apparatus is in service, that is diagnosis is performed by the information processing apparatus simultaneously with predetermined application processing, and the other is the case in which diagnosis is performed while the information processing apparatus is not in service, that is while the information processing apparatus is not conducting application processing. When self-diagnosis is performed while the information processing apparatus is in service, the information processing apparatus runs a diagnostic program on an operating system (OS) (hereinafter called a service OS) which is used to provide service. The information processing apparatus running the diagnostic program on the service OS allows for periodical self-diagnosis in parallel with the execution of application processing and for continuous monitoring of failures of components. Conducting diagnosis while the service OS is running in this manner is called online maintenance or online diagnosis, and a diagnostic program that performs online maintenance is called an online maintenance tool.

In addition, when the information processing apparatus in service performs online diagnosis, the information processing apparatus can change the content of the self-diagnosis operation in accordance with a diagnosis history stored while the information processing apparatus is in service and failure information obtained as a result of the previous diagnoses. Similarly, when the information processing apparatus in service is coupled to external apparatuses, by obtaining information held by the external apparatuses, such as the history of component replacement, or information about the quality of the components used in the information processing apparatus, the operation of the self-diagnosis can be changed in accordance with the replacement history or the quality information.

On the other hand, when the information processing apparatus performs self-diagnosis while the information processing apparatus is not in service, the information processing apparatus runs an OS for maintenance (maintenance OS) instead of the service OS, and a diagnostic program is run on this maintenance OS. The diagnostic program run on the maintenance OS can complete diagnosis in a short period of time by occupying the full processing power of the information processing apparatus for the diagnosis. Furthermore, the self-diagnosis performed while the service is stopped does not depend on the service OS, and diagnosis is possible even in a state in which the service OS is not activated. Maintenance and diagnosis performed without running the service OS or by avoiding activation of the service OS is called offline maintenance, and a diagnostic program that performs offline maintenance is called an offline maintenance tool.

The following patent documents describe related arts: Japanese Laid-open Patent Publication No. 2000-99484, and Japanese Laid-open Patent Publication No. 7-271432.

Diagnosis using an online maintenance tool allows customized diagnosis according to the server configuration or the state of a user operation to be realized by using the diagnosis history and diagnosis error information stored in the user service OS, or information about the quality of components and replacement of the components stored in a maintenance-data storage server. However, in offline diagnosis, which is performed while the service OS is stopped, the above-mentioned various kinds of information cannot be used, and thus the diagnosis is performed with the same priority level (load factor, execution time) for all the servers. As a result, diagnosis with a focus on consumables in accordance with the state of a user operation or with a focus on components likely to have problems cannot be performed.

In other words, the existing technology has a problem in that since various kinds of information collected during online maintenance is information collected by the service OS and can be used only in an environment where the service OS is running, the information collected during online maintenance cannot be used during offline maintenance performed while the service OS is stopped.

More specifically, it is difficult in the existing offline maintenance technology to diagnose components in accordance with priority levels given based on the status of an information processing apparatus, or to perform diagnosis with a focus on locations likely to have problems. For instance, when a central processing unit (CPU), a memory, a hard disk drive (HDD), and an input/output (I/O) device are four components to be diagnosed, processing resources are evenly allocated to CPU diagnosis, memory diagnosis, HDD diagnosis, and I/O diagnosis in the existing offline maintenance.

In offline maintenance, since various kinds of information stored in the service OS during online diagnosis is unable to be referred to, the state of the operation of the information processing apparatus cannot be used for the offline diagnosis even when an HDD failure has been detected or even in a state right after the CPU has been replaced. Therefore, diagnosis focusing specifically on components having problems is preferably not performed, thereby lowering diagnosis efficiency.

In particular, since it is desired that the time is as short as possible during which, for example, an information processing apparatus used as a server is stopped, the low diagnosis efficiency in offline diagnosis causes a serious problem. In addition, when the time during which service may be stopped is specified, there is a problem in that the existing offline diagnosis does not allow the diagnosis to be finished within a specified time, thereby causing the occurrence of an incomplete detection of failures. When the server has a large configuration including many HDDs and I/O devices, or the HDDs have large capacity, it is difficult to finish the diagnosis within a limited time. Therefore, improving the diagnosis efficiency in offline diagnosis is an important problem to be solved.

In view of the above, the present disclosed technology provides an information processing apparatus, a method of diagnosis, and a computer-readable recording medium configured to store a diagnostic program, allowing improved efficiency of offline diagnosis to be realized.

SUMMARY

According to an aspect of the embodiments, an information processing apparatus includes: an information collecting unit that collects information including a diagnosis history regarding a component of the information processing apparatus in application processing by the information processing apparatus; a diagnosis operation determination unit that determines a priority level setting for offline diagnosis of the information processing apparatus based on the information collected by the information collecting unit; and an application-terminated-period diagnosis unit that performs diagnosis of a component at the time of the offline diagnosis based on the priority level setting determined by the diagnosis operation determination unit.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 7 illustrates an example of diagnosis history data;

FIG. 8 illustrates an example of diagnosis error data;

FIG. 9 illustrates an example of quality data;

FIG. 10 illustrates an example of replacement history data;

FIG. 11 illustrates an example of supplemental diagnosis data;

FIG. 12 illustrates an example of priority weighting data;

FIG. 13 illustrates determination of the type of diagnosis operation to be performed made by a diagnosis operation determination unit;

DESCRIPTION OF EMBODIMENTS

Hereinafter, embodiments of an information processing apparatus, a method of diagnosis, and a computer-readable recording medium configured to store a diagnostic program are described in detail with reference to the attached drawings. The present application is not limited by these embodiments.

Figure 1:
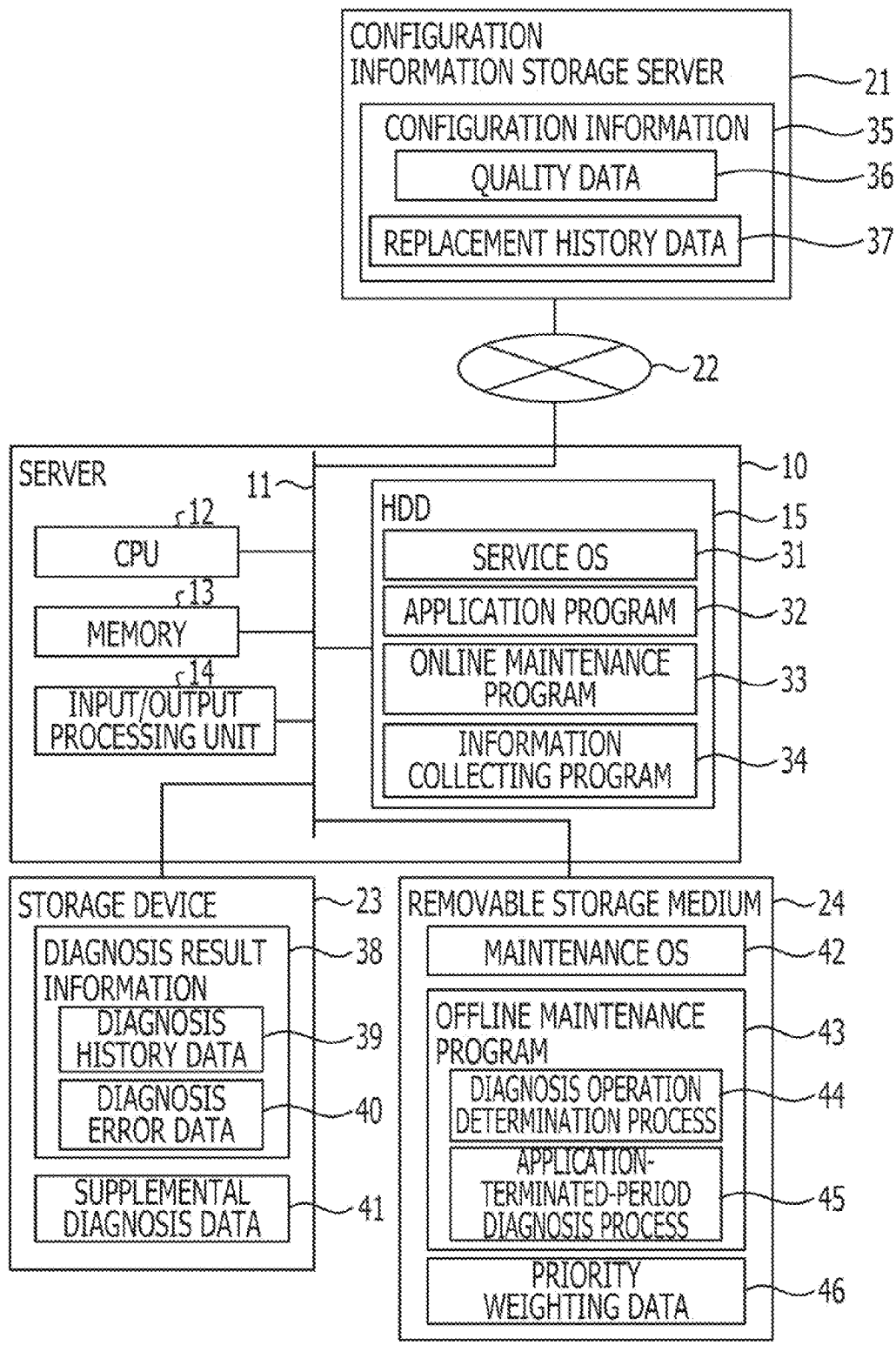
FIG. 1 illustrates a general configuration of a server which is a first embodiment of an information processing apparatus.

FIG. 1 illustrates a general configuration of a server which is a first embodiment of an information processing apparatus. In a server 10 illustrated in FIG. 1, a CPU 12, which is a computing device, a memory 13, which is a main memory, an input/output processing unit 14, which performs input/output (I/O), and an HDD 15, which is an auxiliary storage device, are coupled to one another via a bus 11. Although FIG. 1 illustrates a CPU as an example of the computing device, any computing device, such as a micro processing unit (MPU), may be used.

A storage device 23 and a removable storage medium 24 are coupled to the bus 11 of the server 10. The storage device 23 is, for example, an HDD. Examples of the removable storage media 24 include a compact disc (CD), a digital versatile disc (DVD), and a floppy disk (registered trademark). The removable storage media 24 is coupled to the bus 11 via drive units, which are not illustrated in FIG. 1.

The server 10 is coupled to a configuration information storage server 21 via a network 22. The configuration information storage server 21 stores configuration information 35 which is information about the configuration of the server 10. The configuration information 35 includes quality data 36 which describes the quality of the components of the server 10 and replacement history data 37 which describes the history of component replacement.

The HDD 15 stores a service OS 31, an application program 32, an online maintenance program 33, and an information collecting program 34. When the server 10 is to be put into service, the service OS 31 is loaded in the memory 13 and executed by the CPU 12.

The application program 32, the online maintenance program 33, and the information collecting program 34 are application programs running on the service OS. The application program 32 is software that realizes application processing to be performed by the server 10.

Figure 2:
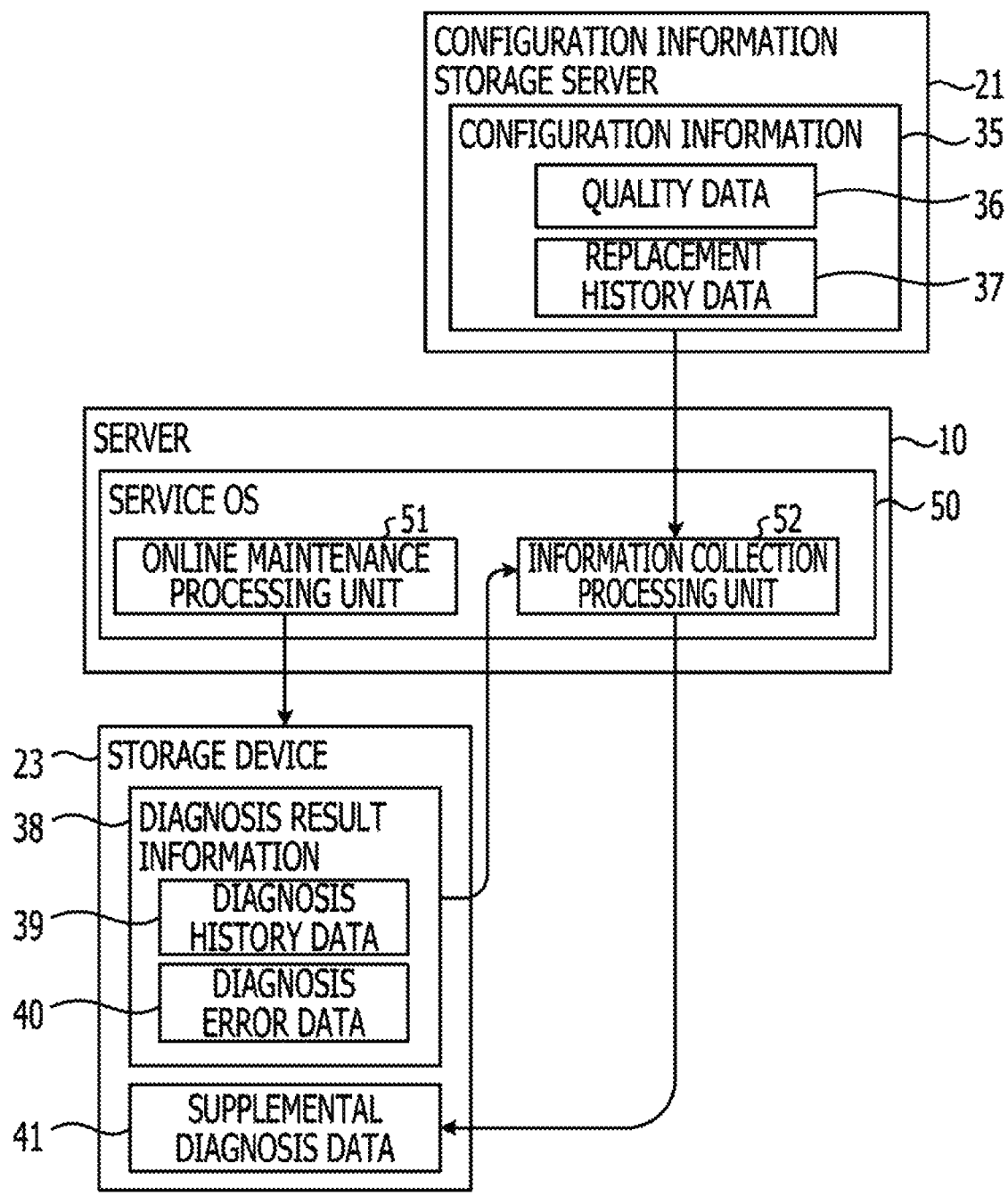
FIG. 2 illustrates the operation of a server in service.

FIG. 2 illustrates the operation of the server 10 in service. The online maintenance program 33 functions as an online maintenance processing unit 51 by operating on a service OS 50. Similarly, the information collecting program 34 functions as an information collection processing unit 52 by operating on the service OS 50.

The online maintenance processing unit 51 performs maintenance processing while the server 10 is in service. This maintenance processing includes diagnosis of the components, such as the CPU 12, the memory 13, the input/output processing unit 14, and the HDD 15. The online maintenance processing unit 51 stores diagnosis result information 38 in the storage device 23. Here, the diagnosis result information 38 may be output to any specified destination, such as the HDD 15, the removable storage medium 24, or other storage devices, which is not illustrated.

The diagnosis result information 38 includes diagnosis history data 39 which describes the history of diagnoses performed by the online maintenance processing unit 51, and diagnosis error data 40 which describes failures or defects detected by the diagnoses.

The information collection processing unit 52 obtains the diagnosis result information 38, which describes a diagnosis history, and the configuration information 35. The diagnosis result information 38 and the configuration information 35, after being subjected to processing, are stored in the storage device 23 as supplemental diagnosis data 41. The supplemental diagnosis data 41 may be stored in any place accessible by a maintenance OS.

Referring back to FIG. 1, descriptions are continued. The removable storage medium 24 stores a maintenance OS 42, an offline maintenance program 43, and priority weighting data 46.

The maintenance OS 42 is loaded in the memory 13 and executed by the CPU 12 in a state in which the service provided by the server 10 is stopped. The offline maintenance program 43 is an application program operating on the maintenance OS. The offline maintenance program 43 includes descriptions of a diagnosis operation determination process 44 and an application-terminated-period diagnosis process 45.

Figure 3:
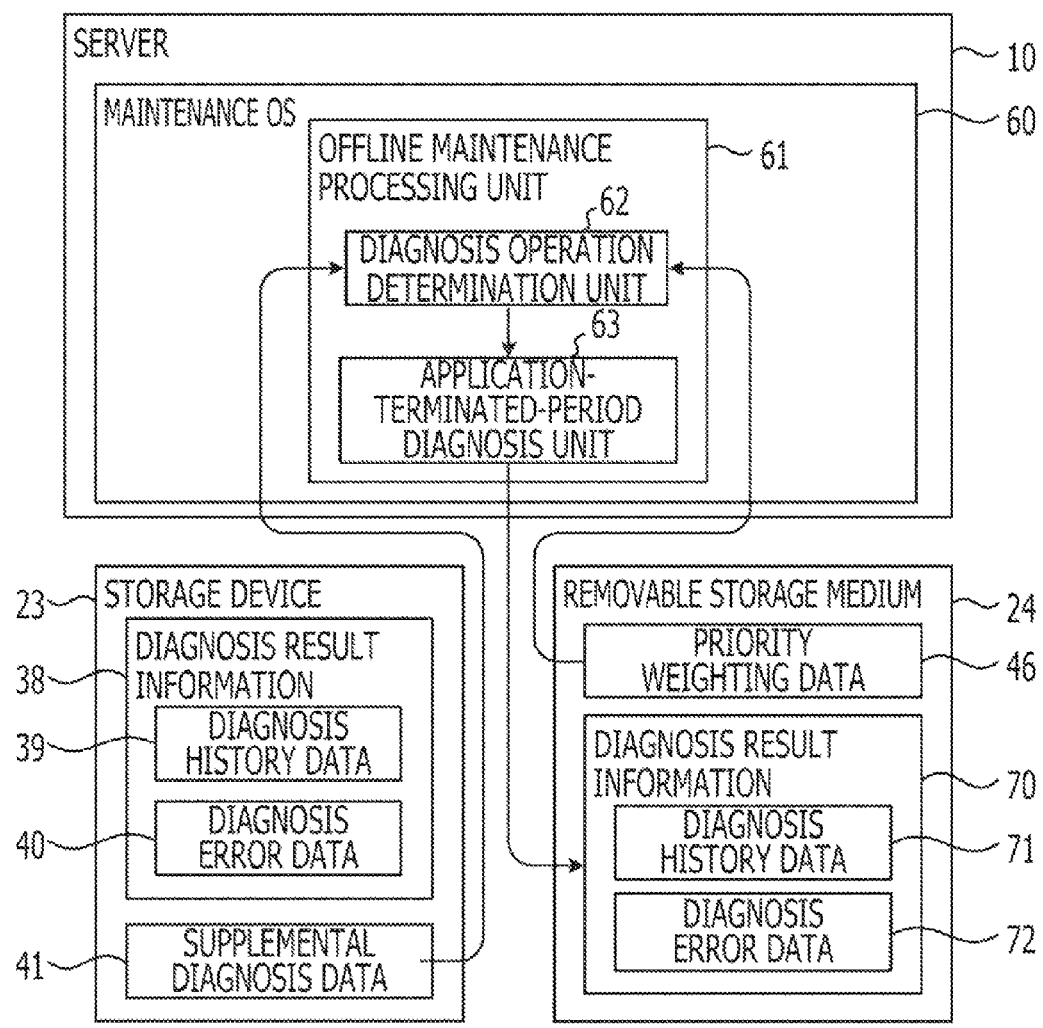
FIG. 3 illustrates the operation of the server which is not in service.

FIG. 3 illustrates the operation of the server 10 which is not in service. The offline maintenance program 43 functions as an offline maintenance processing unit 61 by operating on a maintenance OS 60. The diagnosis operation determination process 44 and the application-terminated-period diagnosis process 45 respectively operate as a diagnosis operation determination unit 62 and an application-terminated-period diagnosis unit 63 within an offline maintenance processing unit 61.

The offline maintenance processing unit 61 performs maintenance processing while the service OS of the server 10 is stopped. This maintenance processing includes the diagnosis of the components, such as the CPU 12, the memory 13, the input/output processing unit 14, and the HDD 15, performed by the application-terminated-period diagnosis unit 63. The type of diagnosis operation to be performed by the application-terminated-period diagnosis unit 63 is determined by the diagnosis operation determination unit 62.

The diagnosis operation determination unit 62 reads the supplemental diagnosis data 41 from the storage device 23 and determines the type of diagnosis operation to be performed based on the supplemental diagnosis data 41. By using the supplemental diagnosis data 41 generated by the server 10 in service in this manner, the diagnosis operation determination unit 62 determines the type of diagnosis operation to be performed in accordance with the information obtained by the server 10 in service. The information obtained by the server 10 in service includes the diagnosis result information 38, which is a diagnosis history.

When the priority weighting data 46 is stored in the removable storage medium 24, the diagnosis operation determination unit 62 uses the priority weighting data 46 for determination of the type of diagnosis operation to be performed. Determination of the type of diagnosis operation using the priority weighting data 46 in this manner allows a user to set any priority level for the diagnosis operation.

The application-terminated-period diagnosis unit 63 performs diagnosis of the components through the type of diagnosis operation determined by the diagnosis operation determination unit 62, and stores diagnosis result information 70 obtained from the diagnosis result in the removable storage medium 24. The diagnosis result information 70 is information similar to the diagnosis result information 38, which is the diagnosis result of the server 10 in service, and includes diagnosis history data 71 and diagnosis error data 72 describing failures or defects detected by the diagnosis.

Here, the diagnosis result information 70 may be output to any destination, such as the HDD 15, the storage device 23, or other storage devices, which is not illustrated. The application-terminated-period diagnosis unit 63 may store the diagnosis result information 70 in the storage device 23 at a location separate from the old diagnosis result information 38, or in such a manner as to overwrite the diagnosis result information 38.

Figure 4:
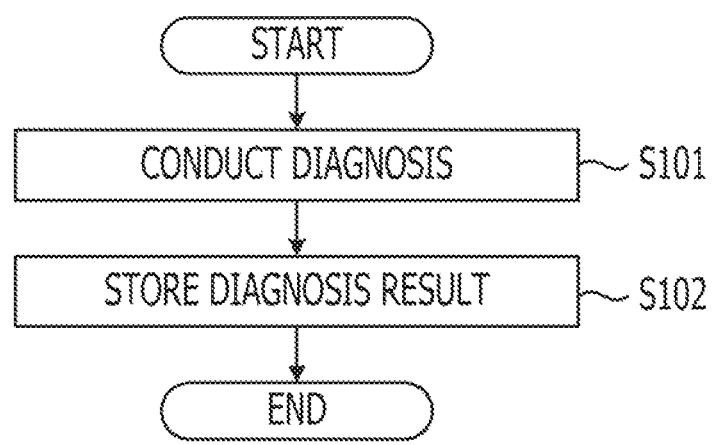
FIG. 4 is a flowchart for describing the processing operation of online maintenance diagnosis performed by an online maintenance processing unit.

FIG. 4 is a flowchart for describing the processing operation of the online maintenance diagnosis performed by the online maintenance processing unit 51. This processing operation may be executed periodically or when a condition specified by a user is satisfied. When the processing operation is started, the online maintenance processing unit 51 diagnoses the components (S101), and stores the diagnosis results as the diagnosis result information 38 in the storage device 23 (S102).

Figure 5:
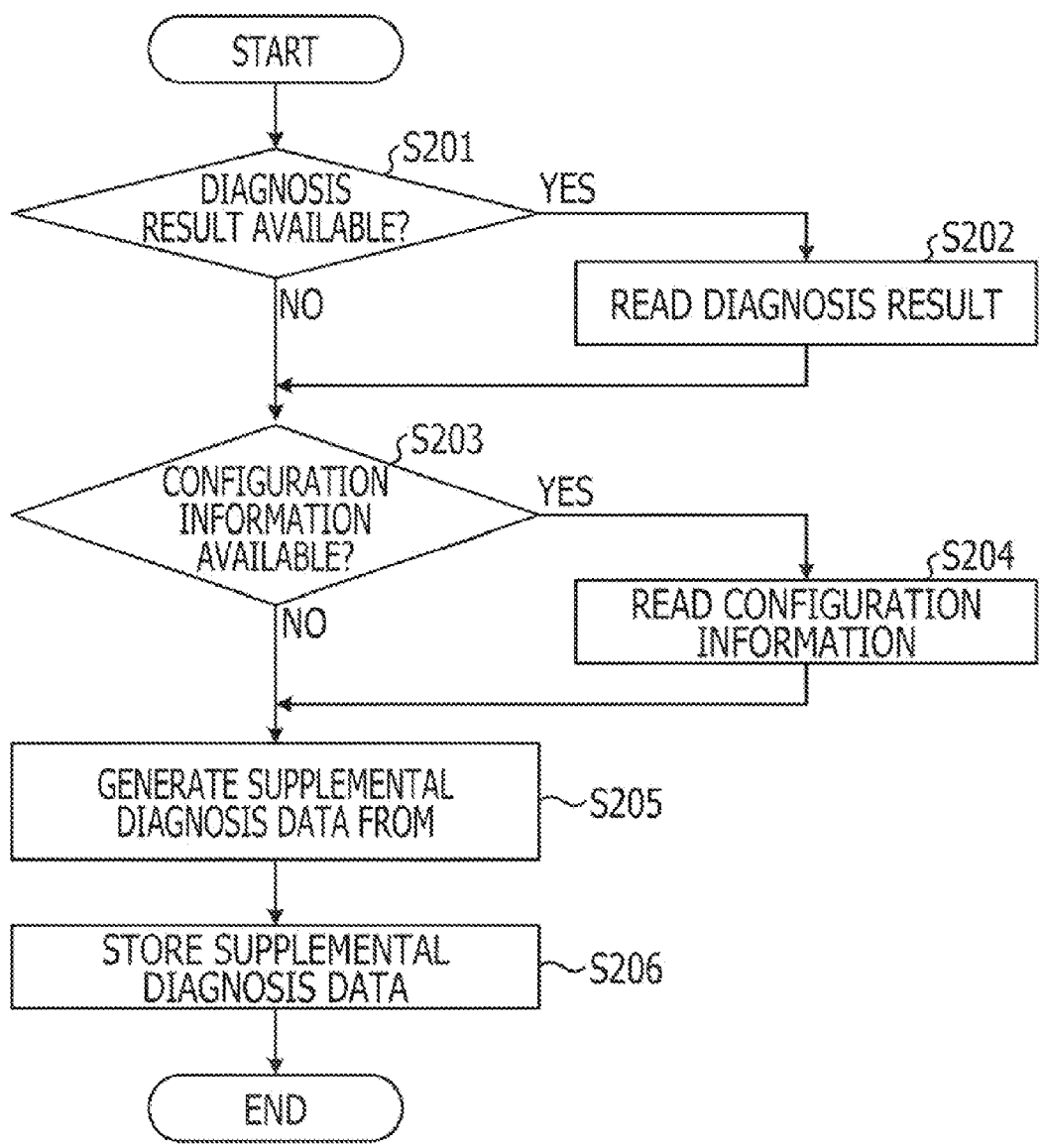
FIG. 5 is a flowchart for describing the processing operation of information collection performed by an information collection processing unit.

FIG. 5 is a flowchart for describing the processing operation of the information collection performed by the information collection processing unit 52. This processing operation of information collection performed by the information collection processing unit 52 is executed when the online diagnosis illustrated in FIG. 4 is finished. This processing operation of information collection performed by the information collection processing unit 52 may be executed periodically or when a condition specified by a user is satisfied.

When the processing operation is started, the information collection processing unit 52 first determines whether or not the diagnosis result information 38 is stored in the storage device 23 (S201). When it is determined that the diagnosis result information 38 is not stored in the storage device 23 (No, in S201), the information collection processing unit 52 proceeds to S203 described below. When it is determined that the diagnosis result information 38 is stored in the storage device 23 (Yes, in S201), the information collection processing unit 52 reads the diagnosis result information 38 (S202), and then determines whether or not the configuration information 35 of the current server (here, the server 10) is stored in the configuration information storage server 21 (S203).

When the configuration information 35 of the server 10 is not stored in the configuration information storage server 21 (No, in S203), the information collection processing unit 52 proceeds to S205 described below. When the configuration information 35 of the server 10 is stored in the configuration information storage server 21 (Yes, in S203), the information collection processing unit 52 reads the configuration information 35 of the server 10 (S204), and generates the supplemental diagnosis data 41 from the obtained diagnosis result information and the configuration information of the server 10 (S205). Then the information collection processing unit 52 stores the generated supplemental diagnosis data 41 in the storage device 23 (S206) and ends the processing.

Figure 6:
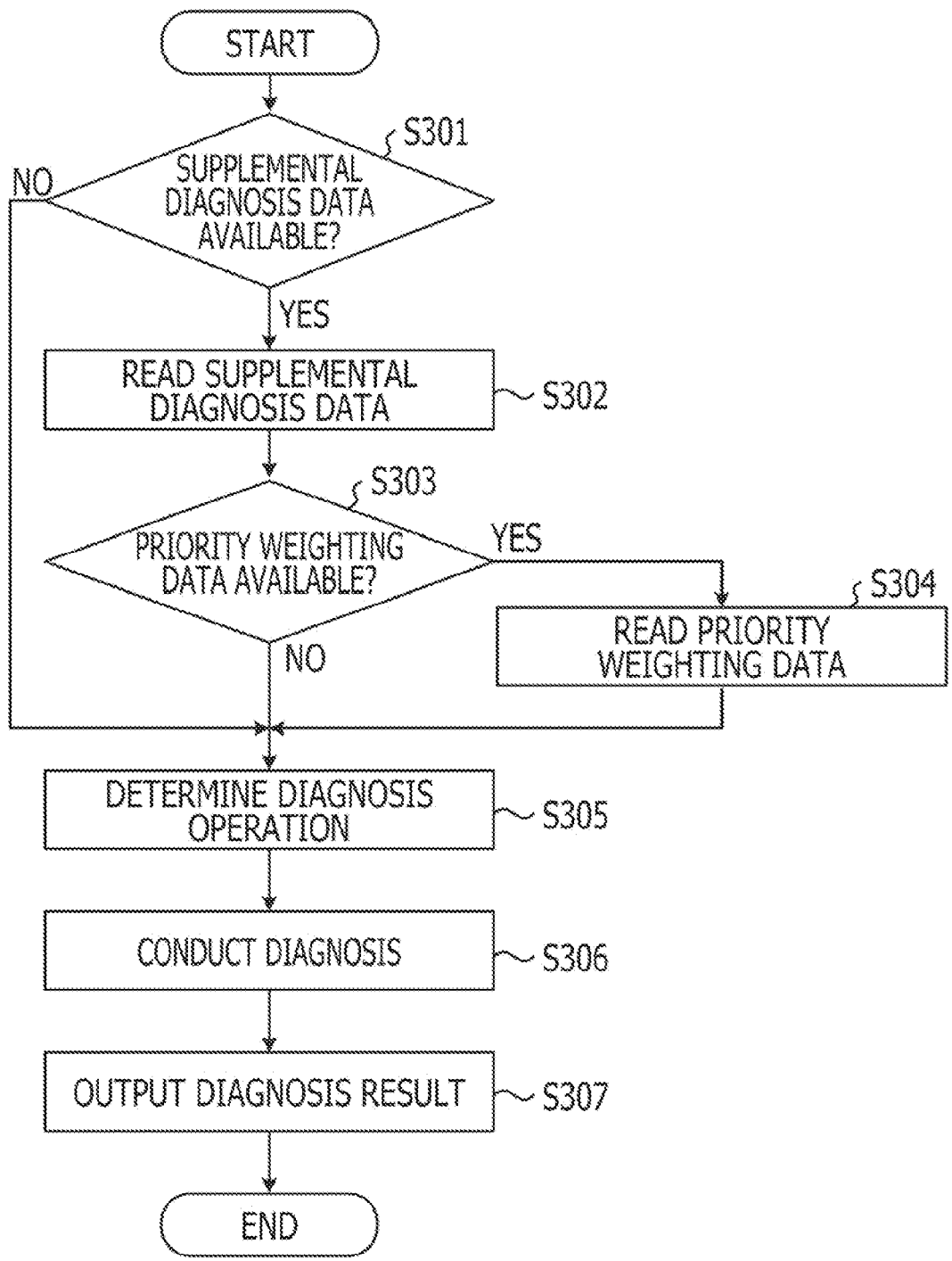
FIG. 6 is a flowchart for describing the processing operation of offline maintenance diagnosis performed by an offline maintenance processing unit.

FIG. 6 is a flowchart for describing the processing operation of the offline maintenance diagnosis performed by the offline maintenance processing unit 61. This processing operation is, for example, automatically started after the maintenance OS 60 has been activated. When the processing operation is started, the diagnosis operation determination unit 62 first determines whether or not the supplemental diagnosis data 41 is stored in the storage device 23 (S301). When it is determined that the supplemental diagnosis data 41 is not stored in the storage device 23 (No, in S301), the diagnosis operation determination unit 62 proceeds to S305 described below. When it is determined that the supplemental diagnosis data 41 is stored in the storage device 23 (Yes, in S301), the diagnosis operation determination unit 62 reads the supplemental diagnosis data 41 (S302).

Subsequent to S302, the diagnosis operation determination unit 62 determines whether or not the priority weighting data 46 is stored in the removable storage medium 24 (S303). When it is determined that the priority weighting data 46 is stored in the removable storage medium 24 (No, in S303), the diagnosis operation determination unit 62 proceeds to S305 described below. When it is determined that the priority weighting data 46 is stored in the removable storage medium 24 (Yes, in S303), the diagnosis operation determination unit 62 reads the priority weighting data 46 from the removable storage medium 24 (S304), and proceeds to S305.

In S305, the diagnosis operation determination unit 62 determines the type of diagnosis operation to be performed using the read supplemental diagnosis data 41 and the read priority weighting data 46. When the supplemental diagnosis data 41 is not stored in the storage device 23 (No, in S301), the diagnosis operation determination unit 62 determines that a predetermined operation is to be used as the diagnosis operation.

Then, the application-terminated-period diagnosis unit 63 diagnoses the server 10 by executing the type of diagnosis operation determined by the diagnosis operation determination unit 62 (S306), outputs the diagnosis result (S307), and ends the processing.

Next, specific examples of the various kinds of information are described. FIG. 7 illustrates an example of the diagnosis history data 39. In the example illustrated in FIG. 7, the diagnosis history data 39 describes the time when a diagnosis was last performed and the diagnosis result, for each of the CPU 12, the memory 13, the HDD 15, and the input/output processing unit 14.

Specifically, the diagnosis history data 39 describes, regarding the CPU 12, that a diagnosis was last performed at 12 of Jul. 1, 2008, and that the diagnosis was completed with no errors detected. The diagnosis history data 39 describes, regarding the memory 13, that a diagnosis was last performed at 12 of Aug. 1, 2008, and that 50% of the diagnosis was finished with no errors detected. Further, the diagnosis history data 39 describes, regarding the HDD 15, that a diagnosis was last performed at 12 of Sep. 1, 2008, and that 30% of the diagnosis was finished before the diagnosis ended due to detection of an error. In addition, the diagnosis history data 39 describes, regarding the input/output processing unit 14, that a diagnosis was last performed at 12 of Sep. 1, 2008, and that 70% of the diagnosis was finished with no errors detected.

FIG. 8 illustrates an example of the diagnosis error data 40. In the example illustrated in FIG. 8, the content of errors are illustrated for those of the CPU 12, the memory 13, the HDD 15, and the input/output processing unit 14 in which an error was detected.

Specifically, the diagnosis error data 40 describes information about two errors. The information about the first error describes that the error was detected at HH (hours):MM (minutes):SS (seconds) of Aug. 30, 2008; the diagnosed apparatus is the input/output processing unit 14; the apparatus was produced by company XX; the model number is XXXX; the logical block address (LBA) at which an error was detected is XXXX; and the type of the error is a "Write Error". Similarly, the information about the second error describes that the error was detected at HH (hours):MM (minutes):SS (seconds) of Oct. 1, 2008; the diagnosed apparatus is the HDD 15; the apparatus was produced by company XX; the model number is XXXX; the logical block address (LBA) at which an error was detected is XXXX; and the type of the error is an "Uncorrectable Error"; and recovery from the error has been made through automatic replacement.

FIG. 9 illustrates an example of the quality data 36. In the example illustrated in FIG. 9, the quality data 36 describes the state of failure occurrences for each model of the servers as quality information. The example illustrated in FIG. 9 specifically describes that in server model A, CPU failures are increasing and HDD errors are frequent; in server model B, CPU failures are frequent; and in server model C, there is no error information.

Although FIG. 9 illustrates an example of the quality data 36 in which data is summarized for each model of the servers, the quality data may be data that is summarized, for example, for each component or a combination of components used in the servers.

FIG. 10 illustrates an example of the replacement history data 37. The example illustrated in FIG. 10 includes information about two replacement histories. The first replacement history information describes that the time of replacement is HH (hours):MM (minutes):SS (seconds) of Jul. 1, 2008; the name and model name of a server in which a component was replaced are respectively server Z and model B; the replaced component is an HDD; the name of the manufacturer of the replaced component is company XX; the model name of the replaced component is XXXX; the mounting location is a 3.5-inch bay #1; and the reason for the replacement is frequent correctable errors. Similarly, the second replacement history information describes that the time of replacement is HH (hours):MM (minutes):SS (seconds) of Sep. 1, 2008; the name and model name of a server in which a component was replaced are respectively server X and model A; the replaced component is a floppy (registered trade mark) drive of a floppy disk, which is an input/output apparatus; the name of the manufacturer of the replaced component is company XX; the model name of the replaced component is XXXX; the mounting location is a 5-inch bay #2; and the reason for the replacement is the floppy disk being inaccessible.

FIG. 11 illustrates an example of the supplemental diagnosis data 41. The supplemental diagnosis data 41 illustrated in FIG. 11 is data, summarized for each component, including the content of the diagnosis history data 39, the diagnosis error data 40, the quality data 36, and the replacement history data 37.

More specifically, the supplemental diagnosis data 41 describes, regarding the CPU 12, that there have been no errors; 100% of the diagnosis was finished at 12 of Jul. 1, 2008 in terms of the diagnosis history; there is no component replacement information; and the quality is normal. Similarly, the supplemental diagnosis data 41 describes, regarding the memory 13, that there have been no errors; 50% of the diagnosis was finished at 12 of Aug. 1, 2008; there is no component replacement information; and the quality is good. The supplemental diagnosis data 41 describes, regarding the HDD 15, that there has been an error at a location indicated by the attached information; 30% of the diagnosis was finished at 12 of Sep. 1, 2008; there is no component replacement information; and the quality is at a warning level. The supplemental diagnosis data 41 describes, regarding the input/output processing unit 14, that there has been an error and recovery from the error has been made; 70% of the diagnosis was finished at 12 of Oct. 1, 2008; the unit was replaced on Sep. 1, 2008; and the quality is good.

FIG. 12 illustrates an example of the priority weighting data 46. The priority weighting data 46 illustrated in FIG. 12, sets a weight for each item of the supplemental diagnosis data 41. Specifically, the priority weighting data 46 sets "20" to "Error detected", and "5" to "No error", for the items of "Diagnosis Error". Similarly, for the items of "Diagnosis History", the priority weighting data 46 sets "20" when the progress of diagnosis is 30% or lower; "15" when the progress of diagnosis is 31% to 60%; "10" when the progress of diagnosis is 61% to 90%; and "5" when the progress of diagnosis is 91% to 100%. For the items of "Replacement Information", the priority weighting data 46 sets "5" to "Replaced" and "20" to "No replacement". For the items of "Quality Information", the priority weighting data 46 sets "5" to "Good quality", "10" to "Normal quality", "15" to "Warning-level quality", and "20" to "Alarm-level quality".

FIG. 13 illustrates the determination of the type of diagnosis operation to be performed made by the diagnosis operation determination unit 62. Referring to FIG. 13, the diagnosis operation determination unit 62 converts the value of each item of the supplemental diagnosis data 41 with reference to the priority weighting data 46, adds the values for each component together, and thereby calculates the priority level.

Specifically, in the example illustrated in FIG. 13, the weights given to the CPU 12 are "5" for no diagnosis error, "5" for the diagnosis history indicating 100% progress, "20" for no replacement, and "10" for normal quality. Therefore, the diagnosis operation determination unit 62, by adding these values together, obtains 40 as the priority level of the CPU 12.

Similarly, the weights given to the memory 13 are "5" for no diagnosis error, "15" for the diagnosis history indicating 50% progress, "20" for no replacement, and "5" for good quality. Therefore the diagnosis operation determination unit 62, by adding these values together, obtains 45 as the priority level of the memory 13.

The weights given to the HDD 15 are "20" for a detected error, "20" for the diagnosis history indicating 30% progress, "20" for no replacement, and "15" for warning-level quality. Therefore the diagnosis operation determination unit 62, by adding these values together, obtains 75 as the priority level of the HDD 15.

The weights given to the input/output processing unit 14 are "20" for a detected diagnosis error, "10" for the diagnosis history indicating 70% progress, "5" for replacement, and "5" for good quality. Therefore, the diagnosis operation determination unit 62, by adding these values together, obtains 40 as the priority level of the input/output processing unit 14.

The diagnosis operation determination unit 62 calculates the sum of these priority levels of the respective components, and allocates the ratio of the priority level of each of the components to the sum of the priority levels as a usage ratio of processing power at the time of diagnosing the component.

The sum of the priority levels is 40+45+75+40=200. Therefore, the diagnosis operation determination unit 62 allocates 20% of the processing power to the diagnosis of the CPU 12, whose priority level is 40. Similarly, the diagnosis operation determination unit 62 allocates 22.5% of the processing power to the diagnosis of the memory 13, whose priority level is 45, and allocates 37.5% of the processing power to the diagnosis of the HDD 15. The diagnosis operation determination unit 62 allocates 20% of the processing power to the diagnosis of the input/output processing unit 14, which has a priority level of 40.

In this manner, the diagnosis operation determination unit 62, by allocating the processing resources of the server 10, resolves the assignment of priority level of diagnosis to each of the components. Allocation of the diagnosis resources is performed, for example, by allocating a utilization rate of the CPU 12 or the memory 13 during the execution of diagnosis. The allocation of diagnosis resources may also be carried out by allocating the time spent for diagnosis of each component.

Such resource allocation allows less resources to be allocated to a component for which diagnosis during an in-service period has been completed, and more resources to be allocated to a component for which progress in diagnosis is less among the components for which diagnosis during an in-service period has not been completed.

In addition, more resources may be allocated to components in which an error has been detected in diagnosis during an in-service period than to components in which an error has not been detected. Similarly, more resources may be allocated to components which have not been replaced than to components for which replacement has been performed. Also, more resources may be allocated to components likely to have a lower quality level than to components likely to have a higher quality level.

Therefore, based on the diagnosis result during an in-service period or information obtained during an in-service period, diagnosis may be performed with a focus on components whose diagnosis during an in-service period was interrupted, components in which an error has been detected, components which have not been replaced, and components likely to have a lower quality level. Although components for which replacement has been performed are assumed to have a higher reliability than components which have not been replaced and are allocated less resources, components for which replacement has been performed may be assumed to have a lower reliability than components which have not been replaced, and thus may be allocated more resources.

Furthermore, for components for which diagnosis during an in-service period has not been completed, the diagnosis operation determination unit 62 determines the type of diagnosis operation to be performed so that diagnosis during an out-of-service period is started at a point at which the diagnosis during an in-service period was terminated. Since the diagnosis of the memory 13 during an in-service period was terminated at the 50% finished point, the diagnosis operation determination unit 62 determines the type of diagnosis operation to be performed so that the diagnosis of the memory 13 during an out-of-service period is started from the 50% finished point. Similarly, since the diagnosis of the HDD 15 during an in-service period was terminated at the 30% finished point, the diagnosis operation determination unit 62 determines the type of diagnosis operation to be performed so that the diagnosis of the HDD 15 during an out-of-service period is started from the 30% finished point. Since the diagnosis of the input/output processing unit 14 during an in-service period was terminated at the 20% finished point, the diagnosis operation determination unit 62 determines the type of diagnosis operation to be performed so that the diagnosis of the input/output processing unit 14 during an out-of-service period is started from the 20% finished point. Since the diagnosis of the CPU 12 during an in-service period has been completed, the diagnosis operation determination unit 62 determines the type of diagnosis operation to be performed so that the diagnosis during an out-of-service period is started from the 0% finished point.

The diagnosis operation determination unit 62 determines the type of diagnosis operation to be performed during an out-of-service period so that diagnosis is performed with a focus on the vicinity of a location at which an error has been detected. In the supplemental diagnosis data 41 illustrated in FIG. 11, an error has been detected in the HDD 15, and a location at which the error has been detected is indicated. Therefore, the diagnosis operation determination unit 62 specifies that diagnosis be performed with a focus on the vicinity of the location at which the error has been detected in the diagnosis of the HDD 15, as illustrated in FIG. 13. As a specific diagnosis operation, at the start of diagnosis, the diagnosis may be first performed for the location on which focus is placed. Diagnosis may be performed more than one time for the location on which focus is placed. In the supplemental diagnosis data 41 illustrated in FIG. 11, although an error has been detected, the input/output processing unit 14 has recovered from the error by replacement. Therefore, the diagnosis operation determination unit 62 does not specify diagnosis with a focus on the vicinity of a specific address, for the input/output processing unit 14.

As has been described above, in the first embodiment, information collected by the information collection processing unit 52 while the server 10 is in service is stored in the storage device 23 as the supplemental diagnosis data 41, and the diagnosis operation determination unit 62 determines the type of diagnosis operation to be performed while the server 10 is not in service based on the supplemental diagnosis data 41.

Determining the type of diagnosis operation to be performed while the server 10 is not in service using information collected while the server 10 is in service in this manner allows diagnosis to be performed in accordance with the state of a user operation. This advantageously results in an increase in the efficiency of self-diagnosis at the time when the service is terminated, an increase in the ability to detect a failed component, and a decrease in maintenance time.

Specifically, by the diagnosis operation determination unit 62 determining the type of diagnosis operation to be performed while the server 10 is not in service using the result of diagnosis performed while the server 10 is in service, self diagnosis in coordination with the diagnosis result obtained in the in-service period may be conducted.

In addition, by the information collection processing unit 52 collecting information about the quality of components or information about the replacement history during an in-service period through a network, the application-terminated-period diagnosis unit 63 may perform self-diagnosis using information which is not accessible from the maintenance OS.

The diagnosis operation determination unit 62, by allocating resources at the time of diagnosis based on the information collected by the information collection processing unit 52, may weight the diagnosis of each component to be diagnosed, whereby efficient diagnosis may be realized.

Furthermore, for a component in which an error has been detected by diagnosis during an in-service period, the diagnosis operation determination unit 62 may perform weighting within the component by determining that diagnosis is to be performed with a focus on the vicinity of the location where the error has been detected.

In addition, as illustrated in FIG. 1, when the diagnosis method disclosed in the first embodiment as the offline maintenance program 43 is carried out, a diagnostic program may be obtained which allows the disclosed diagnosis method to be executed on any computer.

Figure 14:
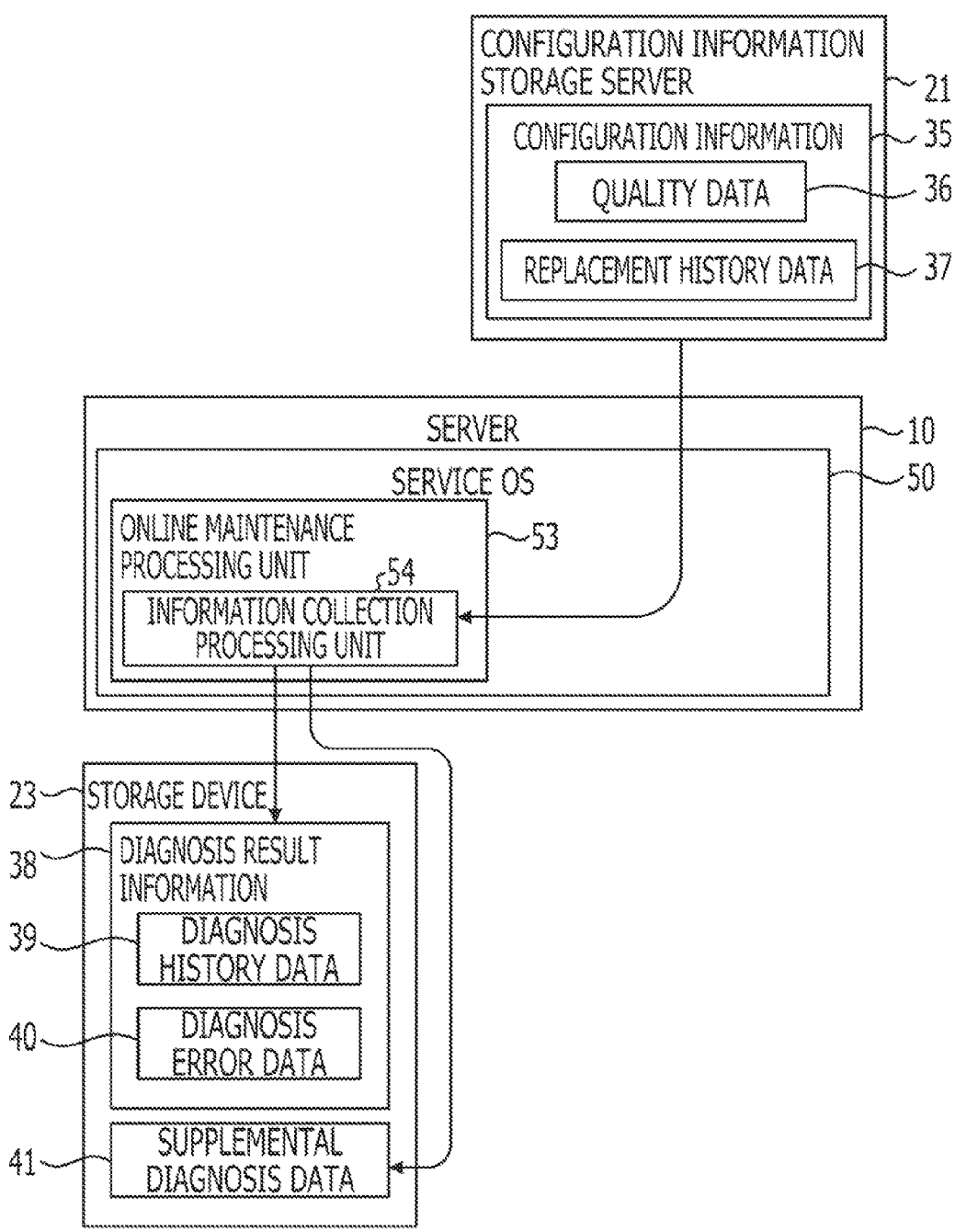
FIG. 14 illustrates the operation of a server in service in a second embodiment.

FIG. 14 illustrates the operation of a server in service in a second embodiment. In the first embodiment, the online maintenance processing unit 51 and the information collection processing unit 52 are independent of each other, and the information collection processing unit 52 reads the diagnosis result information 38 output by the online maintenance processing unit 51 and generates the supplemental diagnosis data 41. In the second embodiment, however, an information collection processing unit 54 is provided within an online maintenance processing unit 53, and the online maintenance processing unit 53 outputs both the diagnosis result information 38 and the supplemental diagnosis data 41. The rest of the configuration and operation are the same as those of the first embodiment, and thus components which are the same as the components of the first embodiment are denoted by the same reference numerals and the descriptions thereof are omitted.

By employing a configuration in which the online maintenance processing unit 53 is made to have the function of the information collection processing unit 54, as in the second embodiment, the diagnosis operation during an in-service period and the creation of the supplemental diagnosis data 41 may be made to coordinate with each other. In addition, compared with the case in which the online maintenance processing unit and the information collection processing unit operate independent of each other, a load imposed on the server 10 is decreased.

Figure 15:
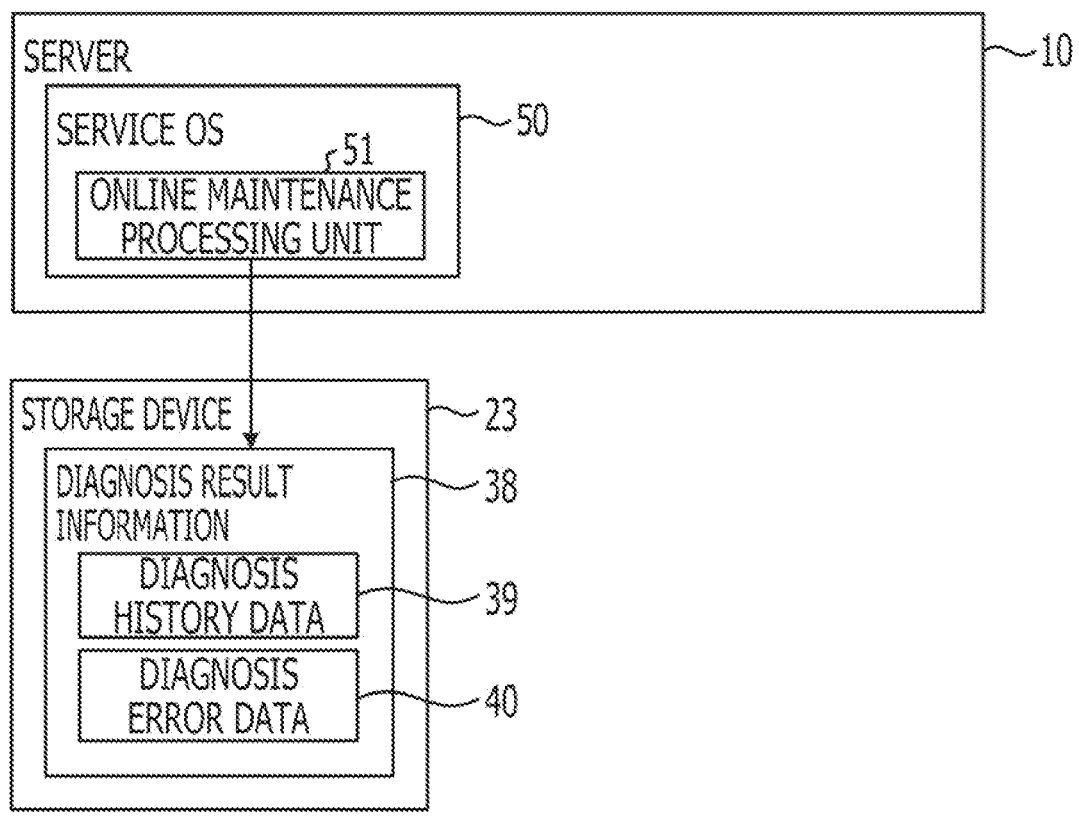
FIG. 15 illustrates the operation of a server in service in a third embodiment.
Figure 16:
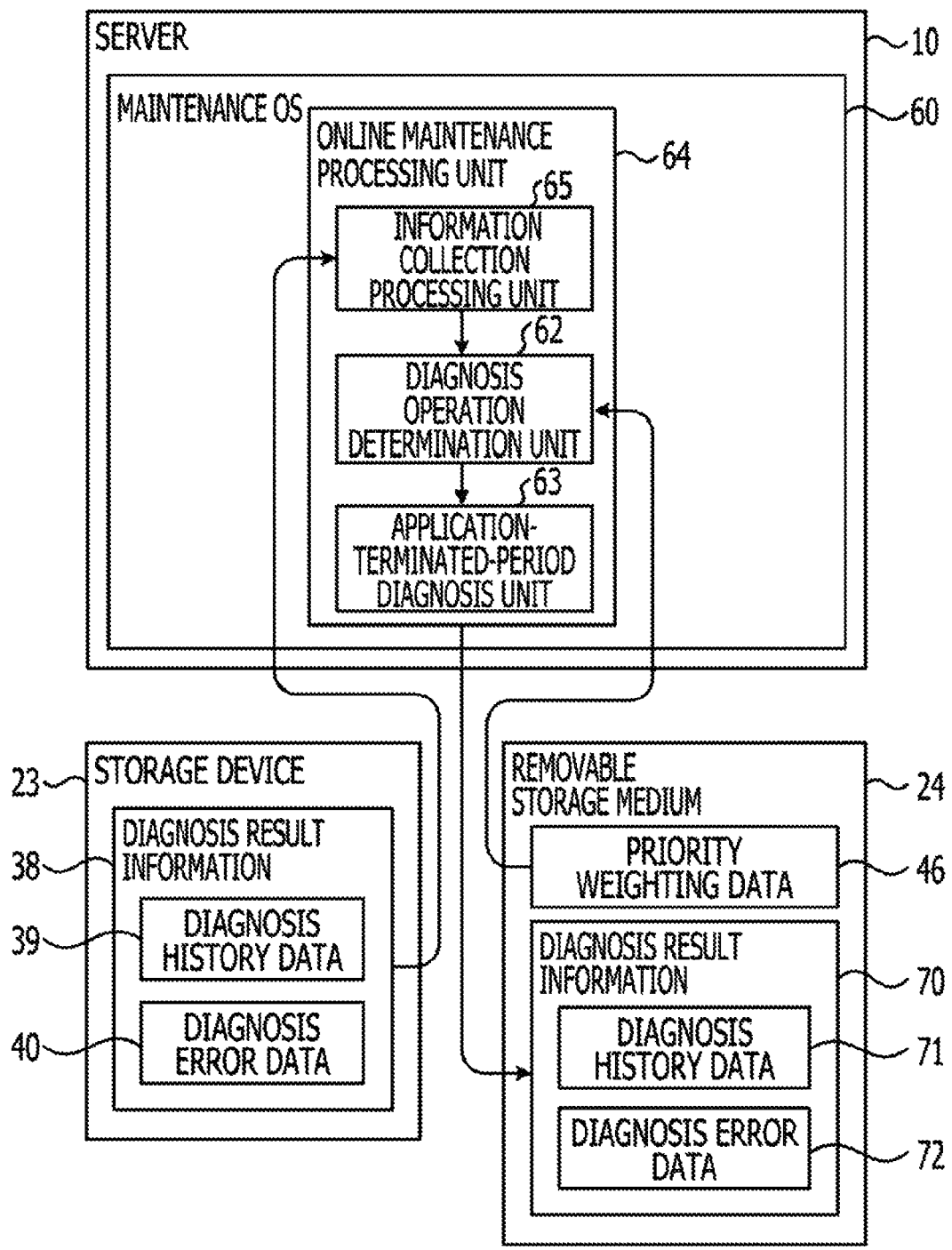
FIG. 16 illustrates the operation of the server which is not in service in the third embodiment.

FIG. 15 illustrates the operation of a server in service in a third embodiment, and FIG. 16 illustrates the operation of the server which is not in service in the third embodiment.

In the first embodiment, the information collection processing unit 52 generates the supplemental diagnosis data 41 during an in-service period and reads and uses the supplemental diagnosis data 41 during an out-of-service period. However, in the third embodiment, information is collected during an out-of-service period. Therefore, during an in-service period, the online maintenance processing unit 51 only outputs the diagnosis result information 38, as illustrated in FIG. 15.

Referring to FIG. 16, during an out-of-service period, an information collection processing unit 65 within an online maintenance processing unit 64 reads the diagnosis result information 38 from the storage device 23, generates the supplemental diagnosis data 41, and delivers the supplemental diagnosis data 41 to the diagnosis operation determination unit 62.

The rest of the configuration and operation are the same as those of the first embodiment, and thus components which are the same as the components of the first embodiment are denoted by the same reference numerals and the descriptions thereof are omitted. In the configuration illustrated in FIG. 16, it is assumed that the maintenance OS 60 does not have a network communication function. Therefore, the information collection processing unit 65 reads only the diagnosis result information 38, but if the configuration information storage server 21 is accessible from the maintenance OS 60, the configuration information 35 may be read.

By employing a configuration in which information collection is performed on a maintenance OS, as in the third embodiment, offline diagnosis may be performed using information generated during an in-service period simply by changing the offline maintenance program 43.

Figure 17:
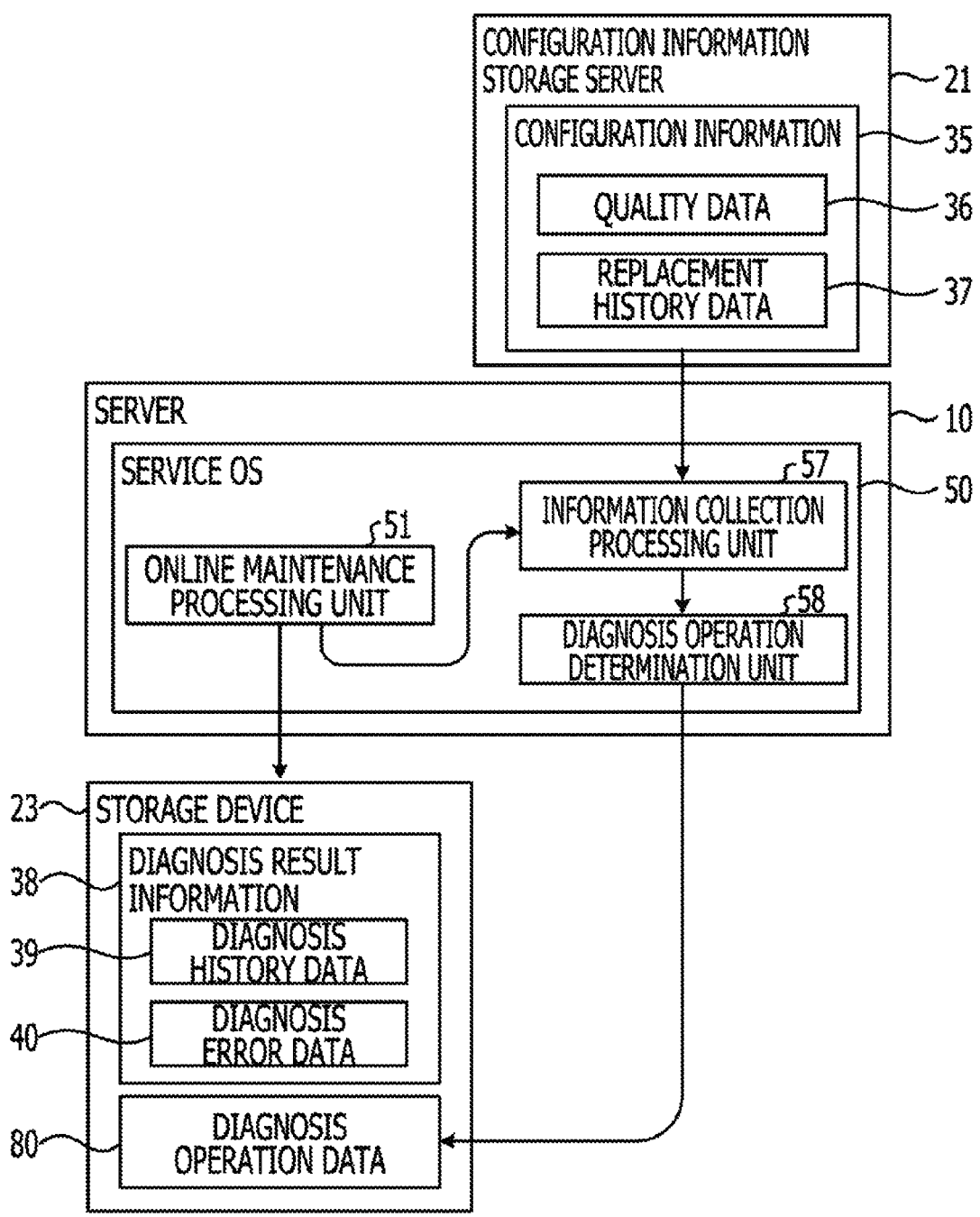
FIG. 17 illustrates the operation of a server in service in a fourth embodiment.
Figure 18:
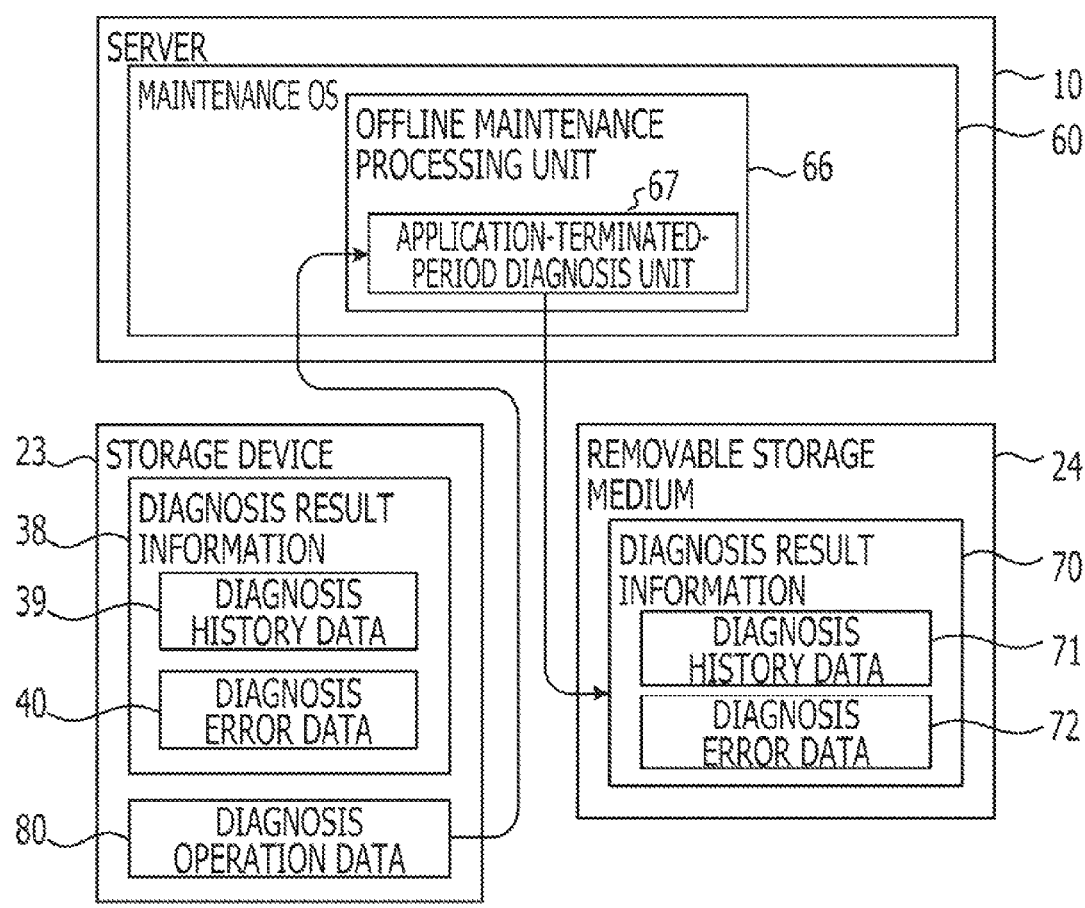
FIG. 18 illustrates the operation of the server which is not in service in the fourth embodiment.

FIG. 17 illustrates the operation of a server in service according to a fourth embodiment, and FIG. 18 illustrates the operation of the server which is not in service in the fourth embodiment.

In the first embodiment, determination of the type of diagnosis operation to be performed is made while the server is not in service. In the fourth embodiment, determination of the type of diagnosis operation to be performed is made while the server is in service.

Specifically, as illustrated in FIG. 17, a diagnosis operation determination unit 58 as well as the online maintenance processing unit 51 and an information collection processing unit 57 operate on the service OS 50. The information collection processing unit 57 generates supplemental diagnosis data (not illustrated) using the diagnosis result information 38 output by the online maintenance processing unit 51 and the configuration information 35 read from the configuration information storage server 21, and sends the supplemental diagnosis data to the diagnosis operation determination unit 58. The diagnosis operation determination unit 58 determines the type of diagnosis operation to be performed based on the supplemental diagnosis data, and writes the result into the storage device 23 as diagnosis operation data 80.

Referring to FIG. 18, an application-terminated-period diagnosis unit 67 within an offline maintenance processing unit 66 operating on the maintenance OS 60 reads the diagnosis operation data 80 from the storage device 23, performs the diagnosis operation specified by the diagnosis operation data 80, and writes the diagnosis result into the removable storage medium 24 as the diagnosis result information 70.

The rest of the configuration and operation is the same as the configuration and operation of the first embodiment, and thus components which are the same as the components of the first embodiment are denoted by the same reference numerals and the descriptions thereof are omitted. In the configuration illustrated in FIG. 17, an example is described in which the type of diagnosis operation to be performed is determined without using the priority weighting data 46. When priority weighting data is available in such a manner as to be accessible from the service OS, the diagnosis operation determination unit 58 may read the priority weighting data and use the data for determination of the type of diagnosis operation to be performed.

By using a configuration in which the type of diagnosis operation to be performed is determined while the service OS is running, as in the fourth embodiment, the time taken for offline diagnosis may be decreased.

The configurations and operations described in the first to fourth embodiments are merely examples, and the disclosed apparatuses, methods, and programs may be appropriately modified. For example, in the first embodiment, a configuration is described in which the type of diagnosis operation to be performed is determined based on the information about a location where an error has been detected, but not limited to this, any information, such as the number of occurrences of errors, may be used for the determination of the type of diagnosis operation to be performed. When the determination of the type of diagnosis operation is made by using the number of errors, the distribution of resources may be changed in accordance with the number of errors, for example.

In the first to fourth embodiments, examples are described in which the disclosed apparatuses, methods, and programs are applied to a server. However, the apparatuses, methods, and programs may be applied to information processing apparatuses for personal use. The application processing includes any personal application processing made to be executed on information processing apparatuses.

What is claimed is:

1. An information processing apparatus comprising:
a memory; and
a processor coupled to the memory and configured to:
collect information including a diagnosis history regarding a plurality of components of the information processing apparatus in application processing by the information processing apparatus,
determine priority level settings from among a plurality of offline diagnoses with regard to each of the components,
prioritize offline diagnosis of the information processing apparatus based on the information and the priority level settings, and
perform the plurality of offline diagnoses with regard to the components at a time of the offline diagnosis of the information processing apparatus based on the priority level settings.

2. The information processing apparatus according to claim 1, wherein the processor is configured to perform allocation of processing power used for the plurality of offline diagnoses with regard to the plurality of components at the time of the offline diagnosis of the information processing apparatus.

3. The information processing apparatus according to claim 1, wherein the processor is configured to collect a result of a diagnosis of at least one of the plurality of components performed in the application processing by the information processing apparatus as the information.

4. The information processing apparatus according to claim 3, wherein the processor is configured to set weighting between diagnosis of a failure location of the at least one of the plurality of components and diagnosis of other locations at the time of the offline diagnosis of the information processing apparatus when the failure location of the at least one of the plurality of components is detected as the result.

5. The information processing apparatus according to claim 3, wherein the plurality of offline diagnoses with regard to the plurality of components takes over the diagnosis of the at least one of the plurality of components performed in the application processing based on the result.

6. The information processing apparatus according to claim 1, wherein the processor is configured to collect, via a network, at least one of information regarding quality of at least one of the plurality of components and information regarding replacement history of the at least one of the plurality of components.

7. The information processing apparatus according to claim 1, wherein the application processing is performed on a first operating system, and the offline diagnosis of the information processing apparatus is performed on a second operating system different from the first operating system.

8. A method of diagnosis comprising:
collecting information including a diagnosis history of a plurality of components of an information processing apparatus in application processing by the information processing apparatus;
determining priority level settings from among a plurality of offline diagnoses with regard to each of the components;
prioritizing offline diagnosis of the information processing apparatus based on the information including the diagnosis history and the priority level settings; and
conducting the plurality of offline diagnoses with regard to the components at a time of the offline diagnosis of the information processing apparatus based on the determined priority level settings.

9. The method according to claim 8, further comprising:
performing allocation of processing power used for the plurality of offline diagnoses with regard to the plurality of components at the time of the offline diagnosis of the information processing apparatus.

10. The method according to claim 8, further comprising:
collecting a result of a diagnosis of at least one of the plurality of components performed in the application processing by the information processing apparatus as the information.

11. The method according to claim 10, further comprising:
setting weighting between diagnosis of a failure location of the at least one of the plurality of components and diagnosis of other locations at the time of the offline diagnosis of the information processing apparatus when the failure location of the at least one of the plurality of components is detected as the result.

12. The method according to claim 10, wherein the plurality of offline diagnoses with regard to the plurality of components takes over the diagnosis of the at least one of the plurality of components performed in the application processing based on the result.

13. The method according to claim 8, further comprising: collecting, via a network, at least one of information regarding quality of at least one of the plurality of components and information regarding replacement history of the at least one of the plurality of components.

14. The method according to claim 8, wherein the application processing is performed on a first operating system, and the offline diagnosis of the information processing apparatus is performed on a second operating system different from the first operating system.

15. A non-transitory computer-readable recording medium configured to store a diagnostic program for conducting offline diagnosis of a plurality of components of an information processing apparatus, the program causing the information processing apparatus to execute:

reading information including a diagnosis history of the components, the information being collected in application processing by the information processing apparatus;

determining priority level settings from among a plurality of offline diagnoses with regard to each of the components;

prioritizing offline diagnosis of the information processing apparatus based on the information and the priority level settings; and conducting the plurality of offline diagnoses with regard to the components at a time of the offline diagnosis of the information processing apparatus based on the determined priority level settings.

\* \* \* \* \*

UNITED STATES PATENT AND TRADEMARK OFFICE
CERTIFICATE OF CORRECTION

| | | |
|---|---|---|
| PATENT NO. | : 8,555,111 B2 | Page 1 of 1 |
| APPLICATION NO. | : 12/913339 | |
| DATED | : October 8, 2013 | |
| INVENTOR(S) | : Ikuo Shimada et al. | |

It is certified that error appears in the above-identified patent and that said Letters Patent is hereby corrected as shown below:

On the Title Page, Item (54) and in the Specification, Column 1, Lines 1-3 should read:

-- METHOD AND APPARATUS FOR OFFLINE DIAGNOSIS BASED ON
  A PRIORITY LEVEL SETTING --

Signed and Sealed this
Seventeenth Day of June, 2014

Michelle K. Lee
*Deputy Director of the United States Patent and Trademark Office*